Figure 5:
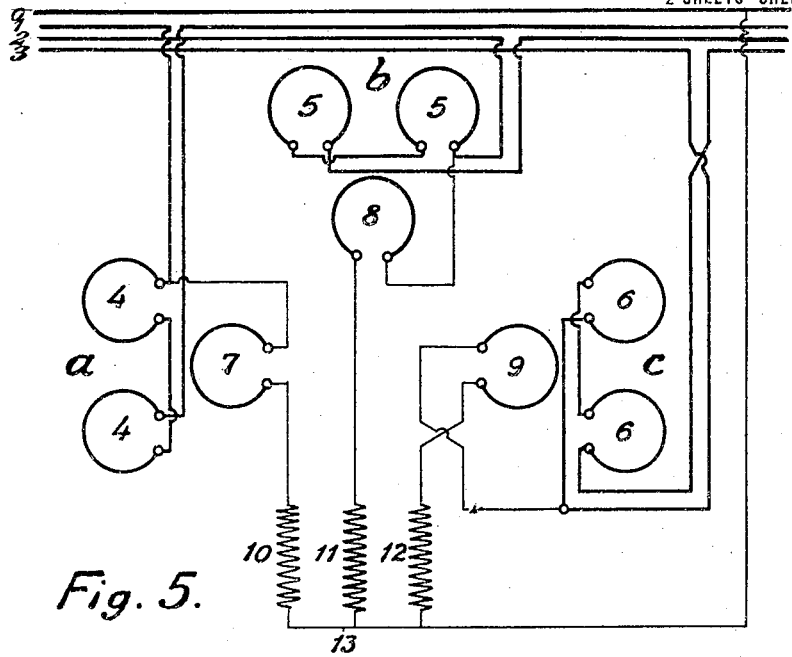

A. LARSEN.
ELECTRICITY METER OF THE INDUCTION MOTOR TYPE FOR THREE PHASE ALTERNATING CURRENT.
APPLICATION FILED MAR. 10, 1919.
1,355,153.
Patented Oct. 12, 1920.
2 SHEETS—SHEET 1.
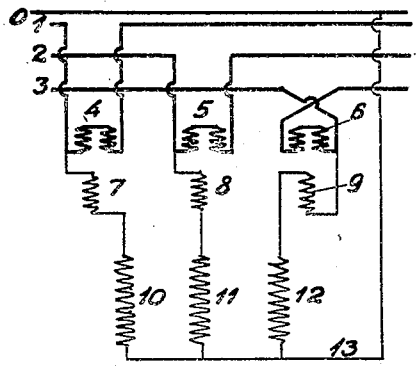
Fig. 1.
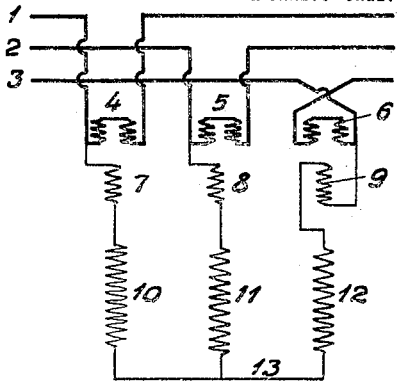
Fig. 2.
Fig. 3.
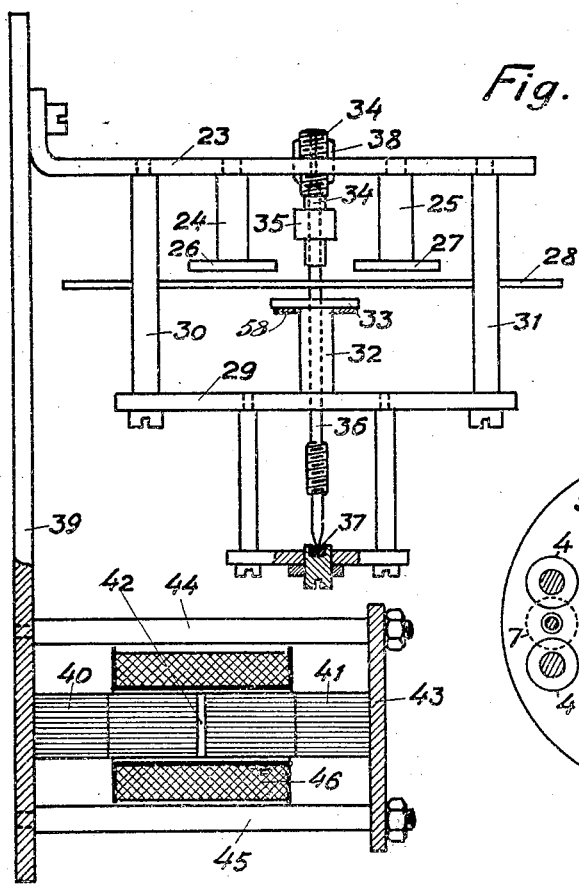
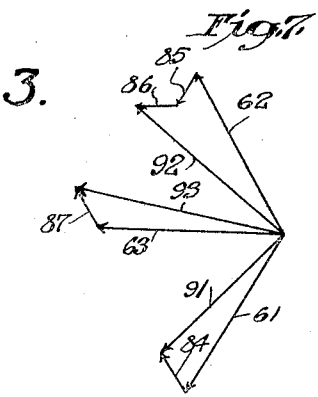
Fig. 4.
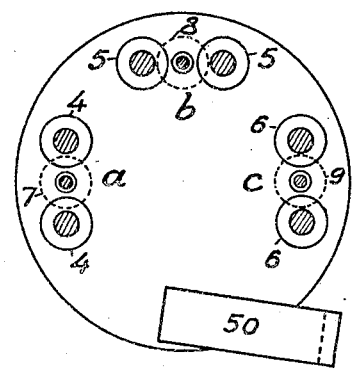
INVENTOR:
Absalon Larsen
By his Attys
Fraser, Dunk & Myers A. LARSEN.
ELECTRICITY METER OF THE INDUCTION MOTOR TYPE FOR THREE PHASE ALTERNATING CURRENT.
APPLICATION FILED MAR. 10, 1919.

1,355,153.

Patented Oct. 12, 1920.

2 SHEETS—SHEET 2.

INVENTOR:
Absalon Larsen
By his Attys

UNITED STATES PATENT OFFICE.

ABSALON LARSEN, OF GENTOFTE, NEAR COPENHAGEN, DENMARK.

ELECTRICITY-METER OF THE INDUCTION-MOTOR TYPE FOR THREE-PHASE ALTERNATING CURRENT.

1,355,153.  Specification of Letters Patent.  Patented Oct. 12, 1920.

Application filed March 10, 1919. Serial No. 281,652.

*To all whom it may concern:*

Be it known that I, ABSALON LARSEN, citizen of the Kingdom of Denmark, residing at Gentofte, near Copenhagen, Denmark, have invented new and useful Improvements in Electricity-Meters of the Induction-Motor Type for Three-Phase Alternating Current, of which the following is a specification.

An electricity meter of the induction motor type for single-phase alternating current has, as it is known, a driving system consisting of a voltage magnet and a current magnet whose alternating fields, independently of one another, induce eddy-currents in a disk of copper or aluminium. The driving torque is produced by each of the two alternating fields acting as a driving force on the eddy-currents produced by the other alternating field. The voltage magnet is, ordinarily, constructed as a choking coil, only a small portion of the lines of force thereof passing through the disk.

If the meter is to be used for three-phase alternating current, it is generally fitted with two driving systems, if it is intended to be used for a network without neutral wire. The two systems act either on diametrically opposite sides of the same disk or on two different disks mounted above one another on the same shaft. If the meter is supposed to be used for a network with neutral wire, it is fitted with three driving systems, acting for instance on three disks mounted on top of each other on the same shaft.

A closer examination of the theory for such electricity meters has resulted in the meter referred to in the present invention, which is cheaper as well as smaller than the heretofore known meters, without being inferior to these in any respect.

The present meter construction is mainly supposed to be used in three-phase meters, but several of the constructional members and arrangements therein may equally well be used for single-phase meters.

The above mentioned three-phase meter with two driving systems is connected to a three-phase network in principally the same manner as two watt-meters. It follows from this that the two driving systems, in case of non inductive load, operate at a 30° phase-displacement between the acting current and the acting voltage. In one of the systems, the current lags 30° behind the voltage, in the other system the current leads 30° in front of the voltage. The driving systems are therefore not fully utilized. At inductive load, the torques of the two systems become different and, at a phase-displacement of 60°, the torque of one of the systems becomes zero. In order that the meter may give correct readings at inductive load, the requirements in respect to the accurate adjustment of the two systems and in respect to their being equally powerful will, therefore, be quite rigid. This is avoided by building a meter with three systems, whereby the three systems in general are uniformly utilized, and the phase-displacement between the driving fields and eddy-currents in each system will equal the phase-displacement of the load.

In order to be able to let all three systems act on the same disk of a size similar to that of a disk in an ordinary single-phase meter, each of the systems must be small. Therefore, the voltage systems in the driving systems are constructed as quite small alternating current magnets, each of the latter being connected in series with a choking coil, and the three choking coils being combined so as to form a three-phase choking coil. Space and iron are saved by this building together of the choking coils of the three systems so as to form one three-phase choking coil. Hereto must certainly be added the small driving magnets, but as the alternating field required for these is very small, they may be constructed, without harm, with solid turned iron cores having disk-shaped pole-shoes. Also the current magnets may be constructed with solid cores and disk-shaped pole-shoes.

The diameter of the current coil becomes thereby so small that the drop of voltage and loss of energy in a current system become essentially smaller than in other alternating current meters.

Figure 6:
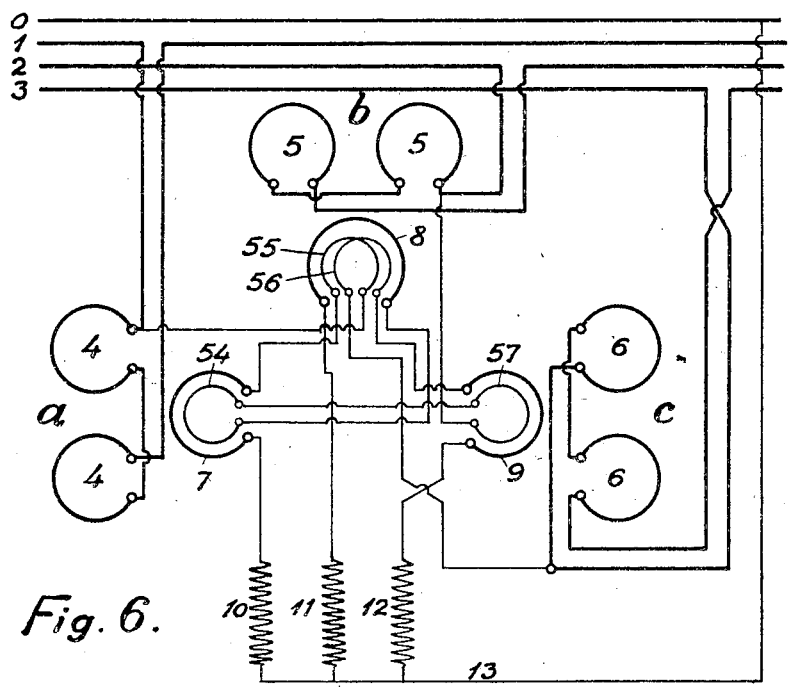

The drawing shows various manners of constructing the invention,

Figure 1 showing the diagram of connections for a three-phase meter in a network with neutral wire, Fig. 2 the same in a network without neutral wire, Fig. 3 a manner of constructing a meter of the kind indicated in Figs. 1 and 2, in side elevation partly in section, Fig. 4 the relative position of the driving systems, Fig. 5 a winding diagram corresponding to the diagram of connections shown in Fig. 1, and Fig. 6 the same with compensating coils on the voltage magnets.

The diagram of connections for a meter with three systems for a network with neutral wire is shown in Fig. 1, where 0, 1, 2 and 3 are the wires in the three-phase network. 4, 5 and 6 are the three sets of current coils, 7, 8 and 9 are the three small voltage coils, 10, 11 and 12 are the three windings of a three-phase choking coil, and 13 is the zero point of the latter. In networks without neutral wire, the connection 13—0 is omitted, while the choking coil, nevertheless, remains star-connected, so that the wiring diagram becomes like the one shown in Fig. 2. In Figs. 1 and 2, the connection to the coils 6 and 9 is shown different from the connections to the coils 4, 5, 7 and 8. This is further explained below (cf. Fig. 5).

Fig. 3 shows one manner of constructing the meter. In the figure there is shown only one of the driving systems, various parts being omitted for the sake of clearness. 23 is a horizontal iron plate, 24 and 25 are the iron cores of the current magnets, which cores are both fastened to the plate 23. 26 and 27 are pole-shoes of iron which are fastened each to one of the iron cores 24 and 25. 28 is a rotary copper or aluminium disk, 29 is an iron disk fastened by means of iron bolts 30 and 31 to the plate 23 and supporting the iron cores 32 of the voltage magnet. 33 is a pole-shoe of iron. 58 is a flat copper ring surrounding the iron core 32 and producing a slight phase displacement in the field of the voltage magnet. 34 is an iron screw encircled by a copper ring 35. This screw by being approached to or removed from the voltage magnet may, thereby, serve to adjust the phase-displacement of the voltage field relatively to the voltage. For the sake of clearness, the windings on the iron cores are not indicated.

Referring further to Fig. 3, 36 is the shaft of the disk 28 and is supported by a step-bearing 37 and guided by a neck-journal bearing 38. The bearings are fastened to the plates 29 and 23, respectively. The counting mechanism and the brake-magnet supported by the plate 23 are not shown in the figure. The plate 23 is fastened on the rear wall 39 of the meter. To the rear wall there is also fastened a three-phase choking coil, whose iron parts 40 and 41 are pressed together by means of the bolts 44 and 45 and the yoke 43. In the air spaces 42 there are inserted disks of mica, press-board or the like.

By the provision of several driving systems acting on the same disk, such precautions must be taken that the fields of the various systems can not act on, or can only act to a slight extent on the eddy-currents of the other systems. The ordinarily used arrangement, viz. to place two systems diametrically opposite to one another on the disk may also be used here. The mutual action of these two systems is then very slight. The third system is placed at equal distances from the two first mentioned ones, so that the location of the three systems becomes as shown in Fig. 4, where $a$, $b$ and $c$ indicate the three systems, while 50 is the brake-magnet. If no special precautions are taken, there will thereby appear mutual actions between the systems $a$ and $b$ and between the systems $b$ and $c$, but by special arrangements described below these effects may be neutralized.

The most essential one of the mutual actions is the one caused by the fact that the voltage fields act on the eddy-currents of the adjacent voltage field. Supposing the voltage coils in the systems $a$, $b$ and $c$ in Fig. 4 to be connected in uniform manner to the three phases in the order 1—2—3, then as it is well known both the mutual action between $a$ and $b$ and the mutual action between $b$ and $c$ will rotate the disk in the direction of the hands of a clock. Now, the three voltage fields being essentially of equal intensity, it is practically possible to make these two effects nullify one another by interchanging the supply wires either for the voltage coil in the system $a$ or for the voltage coil in system $c$. The two driving torques are thereby rendered equal and opposite. Simultaneously, the supply wires for the current coil of the system concerned should of course also be interchanged. This interchange of the connections for the system $c$ is already shown in Figs. 1 and 2.

Fig. 5 shows an example of the complete winding-diagram for a three-phase meter where the above mentioned method of neutralizing the mutual action of the adjacent voltage fields has been employed. 0, 1, 2, 3 are the four conductors. 4—4, 5—5 and 6—6 are the three sets of current coils, and, 7, 8 and 9 are the three voltage coils, while the three systems are indicated by $a$, $b$ and $c$, respectively, as above. In order to indicate the direction of winding, each coil is shown as a single turn, and all these are supposed to be viewed from above. As it appears from the figure, the interchanged (crossed) wires are those feeding the voltage coil 9 and the current coils 6—6 of the system $c$. In a network without neutral wire, the connection 13—0 is omitted, although the three voltage coils are still star-connected.

As to the action of the current fields on the eddy-currents of the adjacent current fields, this will actually be small, as the current fields in each system have upwardly directed lines of force below one of the pole-shoes and, at the same time, downwardly directed lines of force below the other pole-shoe, so that the actions of the two poles would be of equal size and opposite, if the eddy-currents of the adjacent field were equal below both poles, which they will nearly be. This action may, therefore, be kept within harmless limits by the pole-shoes of the current magnets being placed sufficiently near each other. The above mentioned arrangement involving the interchange of the feeding wires for one of the systems $a$ or $c$ will also neutralize this action, however, provided that the load is such that the three currents are alike.

Experiments as well as theory show that the wiring shown by way of example in Fig. 5 completely neutralizes both the mutual action of the voltage fields and the mutual action of the current fields, even in case of the three voltages or the three currents being ever so greatly out of balance, as far as a network without neutral wire is concerned, as shown in Fig. 2. In that case, the geometrical sum of the three currents of the voltage coils will always equal zero and the geometrical sum of the three currents of the current coils will also at any rate be zero, so that the mutual action between the system $b$ and the system $c$ will be numerically equal to the mutual action between the system $b$ and the system $a$. The reason for this is that the mutual action between two current systems is proportional to the product of the two currents multiplied by the sine of the angle of phase-displacement between them and, in quite corresponding manner, the mutual action between the two voltage systems is proportional to the product of the currents of the voltage systems multiplied by the sine of the angle of phase-displacement between them, but when the geometrical sum of any three vectors A, B and C equals zero, then for any of the pairs A and B, B and C or C and A, the product of the amplitudes of the two vectors multiplied by the sine of the angle of the phase-displacement between them will be the same in all three cases.

Another mutual action originates from the voltage fields acting on the eddy-currents of the adjacent current fields. This action may be neutralized completely, if necessary, by compensating coils being placed on each of the voltage coils and connected in series with the adjacent voltage coils.

If, as mentioned above, the mutual action between the systems $a$ and $c$ may be neglected, it will be sufficient to place two compensating coils on the voltage coil of the system $b$, one of these coils being connected in series with the voltage coil of the system $a$ and the other one in series with the voltage coil of the system $c$, and to place, on each of the voltage coils of the systems $a$ and $c$, a compensating coil, both of these coils being connected in series with one another and with the voltage coil of the system $b$.

The complete diagram of connection for a three-phase meter with compensating coils is shown in Fig. 6. 0, 1, 2, 3 are, as before, the four wires. 7, 8 and 9 are the three voltage coils, 4—4, 5—5, 6—6 the three sets of current coils, while 54, 55, 56 and 57 are the compensating coils. 10, 11 and 12 are the three windings of the three-phased choking coil. In all the coils, the direction of winding is indicated by the coils being drawn as a single turn viewed from above.

The effect of a compensating coil will be the geometrical addition, to the voltage field of the system concerned of a small field coinciding in phase with the voltage field of the system to the voltage coil of which the compensating coil concerned is connected in series. This additional field may be resolved into two components one coinciding in phase with the main field concerned and another at right angle thereto. The first one of these components might be dispensed with, without any error of practical importance. The other one is the most important one, as it alters the phase of the field. With the diagram drawn in Fig. 6, and with the phase-order 1—2—3 the compensating coils will turn the vector representing the voltage fields from the coils 7 and 9 slightly backward, and the vector representing the voltage field from the coil 8 twice as much forward. This is clearly understood by means of the vector diagram Fig. 7, where the vectors 61, 62 and 63 represent the voltage fields from the coils 7, 8 and 9 respectively, it being understood that the field from coil 9 has been reversed in direction by the crossing of the feeding wires to this coil.

The small additional fields produced by the compensating coils 54, 55, 56 and 57 are represented by the vectors 84, 85, 86 and 87 respectively. The coils 54 and 57 are connected in series to coil 8 and consequently the fields 84 and 87 produced by them have the direction of the vector 62. Coil 55 is connected in series to coil 7, consequently the field 85 produced by it has the direction of the vector 61, and coil 56 is connected in series to coil 9, consequently the field 86 produced by it has the direction of the vector 63. The resultant voltage fields of the systems $a$, $b$ and $c$ are represented by the vectors 91, 92 and 93 respectively. It will be seen that the vectors 91 and 93 are lagging by a small amount behind the vectors 61 and 63 respectively, and that the vector 92 is leading about twice as much in front of the vector 62. If the meter is used constantly at a certain phase-order, the effect of the compensating coils may therefore, practically, be replaced by introducing a difference in the phase-adjustment of the field 8 as compared with the fields 7 and 9 as shown by 58, Fig. 3. For the phase-order 1—2—3 and for the connection to the network shown in Fig. 6, this substitution may consist of a copper ring placed around the iron core on each of the voltage magnets in the coils 7 and 9. For the phase-order 3—2—1, the substitution might consist of a copper ring placed on the iron core of the voltage magnet in the coil 8.

Experiments as well as theory show also that the simple connecting arrangement shown in Fig. 5 gives a meter sufficiently correct in the cases most frequently occurring in practice, viz. in networks without neutral-wire, when the three currents are not much different, as for instance in motor installations and, in networks with neutral wire, when the load is practically non-inductive, viz. in case of lighting installations, so that the compensating coils shown in Fig. 6 are only necessary in extraordinary cases, where special requirements are to be fulfilled.

Out of the above mentioned arrangements, which all may be used for a three-phase meter, some may equally well be used for single-phase meters. Especially a factory building three-phase meters as described above may, successfully, use the same driving system also for single-phase meters, as the manufacturing process will thereby be simplified. A single-phase meter might then be built essentially like a three-phase one, as shown in Fig. 3, so that the driving system or systems are identically the same as those specified for the three-phase meter, and are mounted on a horizontal plate, in Fig. 3, as in case of the latter.

What I claim is:

1. A three-phase electricity meter of the induction motor type comprising a rotary metal disk, three driving systems $a$, $b$ and $c$ all acting on said disk, each system comprising voltage and current coils two of said three driving systems $a$ and $c$ being placed diametrically opposite one another, and the third driving system $b$ at equal distances from the two systems $a$ and $c$, and feeding wires to the voltage coil and current coils in the system $c$, said wires being crossed so that the torque due to the mutual action between the voltage systems $b$ and $c$ is directed opposite to the torque due to the mutual action between the voltage systems $a$ and $b$.

2. A three-phase electricity meter of the induction motor type comprising a rotary metal disk, three driving systems $a$, $b$ and $c$ all acting on said disk, each system comprising voltage and current coils, two of said three driving systems $a$ and $c$ being placed diametrically opposite one another, and the third driving system $b$ at equal distances from the two systems $a$ and $c$, and feeding wires to the voltage coil and current coils in the system $c$ said wires being crossed, so that the torque due to the mutual action between the voltage systems $b$ and $c$ is directed opposite to the torque due to the mutual action between the voltage systems $a$ and $b$, and a three-phase choking coil having three windings 10, 11 and 12 with which the voltage magnet coils in the systems $a$, $b$ and $c$ are connected in series.

3. A three-phase electricity meter comprising a rotary metal disk, three driving systems $a$, $b$ and $c$ all acting on said disk, each system comprising voltage and current coils one of these systems $b$ being located at equal distances from the two diametrically located systems $a$ and $c$, connecting wires to the voltage coil of the system $c$, said wires being crossed, a three-phase choking coil having three windings 10, 11 and 12 with which the voltage coils in the three systems are connected in series, and compensating coils (54, 55, 56 and 57) on each of the voltage magnets in the systems $a$, $b$ and $c$ in order to compensate the mutual action between the voltage systems and the current systems of the three systems $a$, $b$ and $c$.

4. A three-phase electricity meter comprising a rotary metal disk, three driving systems $a$, $b$ and $c$ all acting on said disk, each system comprising voltage and current coils, one of these systems $b$ being located at equal distances from the two diametrically located systems $a$ and $c$ connecting wires to the voltage coil in system $c$ said wires being crossed, a three-phase choking coil having three windings 10, 11 and 12 with which the voltage coils in the systems $a$, $b$ and $c$ are connected in series, and compensating coils (54, 55, 56 and 57) on each of the voltage magnets in the systems $a$, $b$ and $c$, connecting wires to the voltage coil in system $c$ said wires being crossed, a three-phase choking coil having three windings 10, 11 and 12 with which the voltage coils in the systems $a$, $b$ and $c$ are connected in series, and compensating coils (54, 55, 56 and 57) on each of the voltage magnets in the systems $a$, $b$ and $c$ in order to compensate the mutual action between the three voltage systems and the three current systems of the systems $a$, $b$ and $c$ the said compensating coils being short-circuited rings of highly conductive material.

In testimony whereof I have signed my name to this specification in the presence of two subscribing witnesses.

ABSALON LARSEN.

Witnesses:
 KNUD RABBEK,
 ALFRED JOHNSEN.